United States Patent Office 3,145,167
Patented Aug. 18, 1964

3,145,167
REMOVING PHENOLS FROM AQUEOUS MEDIA
Max E. Elder, Carl Moore, and William F. Tousignant, Midland, Mich., assignors to The Dow Chemical Company, Midland, Mich., a corporation of Delaware
No Drawing. Filed July 3, 1961, Ser. No. 121,352
5 Claims. (Cl. 210—41)

This invention concerns the removal of phenols from aqueous media by complex formation on water-insoluble 2-oxazolidinone-, 2-oxazinidinone- or 2-oxazepidinone-substituted resins.

It is known to remove phenolic compounds from aqueous media with activated charcoal and with strongly basic anion exchange resins such as Dowex-1, Dowex-2 and Dowex-21K resins. However, such sorbents are difficult or impossible to regenerate, hence are usually not economic.

It has now been discovered that water-insoluble polymeric vinylbenzyl resins having 2-oxazolidinone, 2-oxazinidinone or 2-oxazepidinone substituent groups at available benzylic carbon atoms not only are quite efficient in removing phenolic compounds from aqueous media but also are capable of regeneration by reaction of such phenol-laden resins with a 0.1 to 4-normal aqueous solution of an alkali metal, alkaline earth metal or ammonium hydroxide, hereafter referred to as a strong alkali.

By a phenol is meant monohydric or dihydric phenols, their 1 to 4 carbon alkyl homologs and analogs and their chloro-, bromo- and nitro-analogs.

The resins used in the process of this invention are copolymers of 0.9 to 4 mole percent of a crosslinking agent having two non-conjugated vinylidene groups with a balance of combined

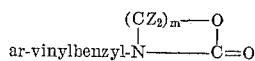

moieties, wherein each Z independently is a member of the group of H, 1 to 4 carbon alkyl groups and 6 to 10 carbon aryl groups, not more than one of which is such an aryl group, and $m$ is an integer from 2 to 4.

The resins useful in the process of this invention are prepared by reacting an alkali metal salt of a 2-oxazolidinone, 2-oxazinidinone or 2-oxazepidinone having the formula:

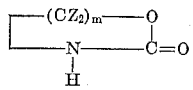

wherein Z has the significance indicated above with an ar-chloromethylvinylaryl polymer having 0.75 to 1.5 chloromethyl groups per available aryl nucleus, crosslinked with between 0.9 and 4 mole percent, vinylaryl polymer basis, of a crosslinking agent having two non-conjugated vinylidene groups, in stoichiometric or substantially stoichiometric proportions until at least 60% of the benzylic chloride is replaced by an oxazolidinone, oxazinidinone or oxazepidinone group, as specified.

Ar-chloromethylvinylaryl resinous polymers which can be prepared by known procedures for use in the above resin-forming reaction include those of styrene, o-, m- and p-methylstyrenes, vinylxylenes, o-, m- and p-ethylstyrenes, vinylnaphthalene, vinylanthracene, their mixtures, homologs and analogs, wherein such crosslinking agents are combined as divinylbenzene, divinyltoluene, divinylxylene, divinylethylbenzene, divinylnaphthalene, diacrylate esters, dimethacrylate esters, diallyl esters, methylene bisacrylamide, etc. The preparation of resins used in the process of this invention is given in detail in U.S. patent application Serial No. 114,302, filed June 2, 1961, now abandoned.

In practice, the phenol-containing aqueous solution to be treated is contacted batchwise or in columnar manner with the water-insoluble water-swollen resin beads described above, with or without agitation, at a temperature between the freezing point of the solution and 100° C., advantageously at room temperature, for a time sufficient and with an amount of resin sufficient to reduce the phenol level to a desired value. Generally, resin in amount of 20 g./liter of solution and a contact time of 30 minutes will suffice at room temperature and with 50–100 U.S. mesh resin bead size. For greater contact, the resin beads can be comminuted to increase surface area. The phenolic solution to be treated also may be passed through a bed of the water-insoluble resin beads at a flow rate sufficient to remove the desired amount of phenol. A simple use test suffices to determine optimum operating conditions for a given phenolic solution.

The breakthrough point, when a phenol appears in the effluent, or appears in a greater concentration than is desired, can be determined by standard analytic procedures, advantageously colorimetric procedures.

By using the process of this invention, the phenolic content of an aqueous solution can be reduced from about 1% to about 0.1 part per million. Should the solution from which it is desired to remove a phenol be too concentrated, it is simply diluted with water prior to treatment by the proposed process.

The following examples describe completely representative specific embodiments and set forth the best mode contemplated by the inventors of carrying out their invention.

EXAMPLE 1

Aqueous solutions of tetrachlorophenol and trichlorophenol in approximately 3 to 1 ratio of the former to the latter, also containing a small amount of inert detergent, were treated with various amounts of a water-swollen water-insoluble polyvinylbenzyl resin having 5-methyl-2-oxazolidinone moieties attached at benzylic carbon atoms. The resin was prepared by chloromethylating a polystyrene (99%) divinylbenzene (1%) copolymer bead form of resin of 50–100 U.S. mesh size and reacting the chloromethylated copolymer with a stoichiometric equivalent of N-sodio-5-methyl-2-oxazolidinone. Contact time was varied between 5 minutes and 180 minutes by stirring the beads of such resin (hereafter designated PVBO–M) continually in a beaker of the phenol-contaminated water, then filtering the resin off at the end of various times. The water was then analyzed for content of chlorinated phenols by using selected lines in the ultraviolet region and measuring absorption of these lines in an ultraviolet spectrophotometer. Results are given in Table I.

Table I
REMOVAL OF CHLOROPHENOLS FROM WATER
[PVBO-M beads; pH=6.9; temp.=30°-32° C.]

| Run No. | Amount of Resin (g./liter of solution) | Time of Exposure (min.) | Analysis (p.p.m. of chlorophenols) |
|---|---|---|---|
|  | 0 | 0 | 80 |
| 1-A | 2 | 5 | 75.5 |
| 1-B | 20 | 5 | 47 |
| 1-C | 80 | 5 | 5 |
| 1-D | 150 | 5 | 2.4 |
| 2-A | 2 | 30 | 63.5 |
| 2-B | 20 | 30 | 1.2 |
| 2-C | 80 | 30 | 1.0 |
| 2-D | 150 | 30 | 1.0 |
| 3-A | 2 | 60 | 61.1 |
| 3-B | 20 | 60 | 1.2 |
| 3-C | 80 | 60 | 1.2 |
| 3-D | 150 | 60 | 1.0 |
| 4-A | 2 | 180 | 53 |
| 4-B | 20 | 180 | 1.1 |
| 4-C | 80 | 180 | 1.0 |
| 4-D | 150 | 180 | 0.4 |

It is clear from examination of these data that PVBO-M beads at a 20 g./liter level or higher removed the chlorophenols in a 30-minute period. The initial stock solution contained 80 p.p.m. of the chlorophenols and after treatment contained only about 1 p.p.m.

To determine the efficiency of the beads after repeated exposure to phenol-contaminated water, the tests reported in the following example were also run.

EXAMPLE 2

A chlorophenol solution similar to that of the previous example was treated with various amounts, as g./liter, of PVBO-M resin beads. Treatments were each of 60 minutes' duration. The treatments were repeated 5 times on each separate bead sample (20 g./liter, 50 g./liter and 100 g./liter level). Chlorophenol content of the treated water was again determined by measuring the ultraviolet absorption at predetermined lines using 0.1-normal sodium hydroxide medium.

Table II

| Cycle | 20 g./liter | | 50 g./liter | | 100 g./liter | |
|---|---|---|---|---|---|---|
|  | Trichlorophenol [1] | Tetrachlorophenol [1] | Trichlorophenol | Tetrachlorophenol | Trichlorophenol | Tetrachlorophenol |
| 0 | 29 | 67 | 29 | 67 | 29 | 67 |
| 1 | 0.6 | 0.6 | 0.6 | 0.6 | 0.6 | 0.6 |
| 2 | 1.1 | 3.6 | 0.4 | 0.2 | 1.1 | 0.2 |
| 3 | 2.6 | 21.0 | 0.1 | 0.3 | 0.1 | 0.3 |
| 4 | 3.8 | 39.2 | 0.1 | 0.9 | 0.4 | 0.2 |
| 5 | 4.3 | 26.0 | 0.6 | 0.5 | 0.4 | 0.3 |

[1] P.p.m.

The solutions were recycled without regenerating the resin beads.

It is clear that at the 50 g./liter level and higher the beads operate to remove chlorophenols in several cycles and remain efficient.

Similar advantageous results are obtained with phenol, its 1 to 4 carbon alkyl homologs and analogs, and its monochloro-, dichloro- and nitro-analogs. Columnar operation requires a column of resin sufficiently deep, or columns in series, or recycling, in order to afford a contact time sufficient to remove phenols from their aqueous solutions.

EXAMPLE 3

Two batches of resinous beads of 4% divinylbenzene-crosslinked poly(vinyl-N-benzyl - 5 - methyl-2-oxazolidinone) were immersed in duplicate amounts of an aqueous solution of a mixture of trichloro- and tetrachlorophenols. In each case 12.5 g. of resin, dry basis, was immersed in 250 ml. of a solution of the chlorinated phenols and stirred with a magnetic stirrer for one hour. At the end of that time the beads were filtered off and each quantity of beads was placed in a fresh 250 ml. volume of similar phenolic solution. Three cycles were run on the same bead samples. The treated solutions were analyzed for content of chlorinated phenols by ultraviolet spectrometry. The results of the analyses are given in Table III.

Table III
TREATMENT OF CHLORINATED PHENOL SOLUTION WITH 4% CROSSLINKED PVBO-M BEADS

| Run No. | Cycle | Amount of Resin, g./liter | Analysis of Treated Water | |
|---|---|---|---|---|
|  |  |  | Trichlorophenol [1] | Tetrachlorophenol [1] |
| Blank | 0 | 0 | 29 | 67 |
| Batch 1 | 1 | 50 | 13 | 35 |
|  | 2 | 50 | 10 | 44 |
|  | 3 | 50 | 11 | 52 |
| Batch 2 | 1 | 50 | 7 | 37 |
|  | 2 | 50 | 10 | 54 |
|  | 3 | 50 | 11 | 56 |

[1] P.p.m.

The solutions were recycled without regenerating the resin beads.

The removal of chlorophenates with 4% crosslinked resin beads was less efficient than that with 1% crosslinked beads, as would be expected.

EXAMPLE 4

An aqueous solution containing 5145 p.p.m. of phenol was passed through a resin column containing 213.2 g. of water-wet beads (having 36.2% water, 136 g. dry basis, the composition of which was similar to that used in Example 1) in a column 23 in. in length by 1 in. in diameter. The rate passage of phenol solution was 8–10 ml./min. Results obtained are as follows.

Table IV

| Total effluent, mls.: | Phenol, p.p.m. |
|---|---|
| 1200 | 0.03 |
| 2100 | 3.0 |
| 2220 (breakthrough) | 6.0 |
| 2450 | 28.0 |

Thus, the capacity of the 136 g. of resin beads used was $$\frac{0.005145 \times 2220}{136}$$

or $$\frac{8.4 \text{ g. phenol}}{100 \text{ g. resin}}$$

The resin column was regenerated by stripping the phenol with aqueous 1-normal NaOH.

What is claimed is:

1. Process for removing a phenol from an aqueous solution thereof by contacting said solution with a particulate resinous copolymer of 0.9 to 4 mole percent of a crosslinking agent having two non-conjugated vinylidene groups and a balance of ar-vinylbenzyl moieties having attached at their benzylic carbon atoms substituent groups of the formula:

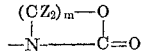

wherein Z is independently selected from the group consisting of H, alkyl groups having 1 to 4 carbon atoms and up to one aryl group having 6 to 10 carbon atoms, and $m$ is an integer from 2 to 4, said resinous copolymer being present in amount sufficient to reduce the phenol content of said solution.

2. The process of claim 1 wherein the solution is passed through a bed of said resinous particles.

3. The process of claim 1 wherein said resinous copolymer is that of 3-(ar-vinylbenzyl)-5-methyl-2-oxazolidinone and 0.9 to 4 mole precent of divinylbenzene.

4. The process of claim 1 wherein said solution is that of a mixture of trichlorophenol and tetrachlorophenol.

5. The process of claim 1 wherein said solution is that of phenol.

References Cited in the file of this patent

UNITED STATES PATENTS 2,808,375    Manka _____ Oct. 1, 1957

OTHER REFERENCES

Chasanov: "Sorption of Phenols by Anion Exchange Resins," Industrial and Engineering Chemistry, vol. 48, No. 2, February 1956, page 305.